United States Patent
Guo et al.

(10) Patent No.: US 8,234,274 B2
(45) Date of Patent: Jul. 31, 2012

(54) SYSTEMS AND METHODS FOR CHARACTERIZING LINKED DOCUMENTS USING A LATENT TOPIC MODEL

(75) Inventors: Zhen Guo, Elkins Park, PA (US); Shenghuo Zhu, Santa Clara, CA (US); Yun Chi, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 242 days.

(21) Appl. No.: 12/629,043

(22) Filed: Dec. 1, 2009

(65) Prior Publication Data

US 2010/0161611 A1    Jun. 24, 2010

Related U.S. Application Data

(60) Provisional application No. 61/138,646, filed on Dec. 18, 2008.

(51) Int. Cl.
*G06F 7/00* (2006.01)
*G06F 17/30* (2006.01)

(52) U.S. Cl. ........................................ 707/726; 707/729

(58) Field of Classification Search .................. None
See application file for complete search history.

(56) References Cited

U.S. PATENT DOCUMENTS

| | | | | |
|---|---|---|---|---|
| 6,098,062 A * | 8/2000 | Janssen | | 706/59 |
| 6,115,718 A * | 9/2000 | Huberman et al. | | 1/1 |
| 6,128,613 A * | 10/2000 | Wong et al. | | 707/738 |
| 6,285,999 B1 * | 9/2001 | Page | | 1/1 |
| 6,389,436 B1 * | 5/2002 | Chakrabarti et al. | | 715/229 |
| 6,862,710 B1 * | 3/2005 | Marchisio | | 715/206 |
| 2002/0103793 A1 * | 8/2002 | Koller et al. | | 707/3 |
| 2003/0033333 A1 * | 2/2003 | Nishino et al. | | 707/531 |
| 2003/0135826 A1 * | 7/2003 | Dozier | | 715/515 |
| 2003/0167252 A1 * | 9/2003 | Odom et al. | | 707/1 |
| 2004/0068697 A1 * | 4/2004 | Harik et al. | | 715/513 |
| 2004/0083424 A1 * | 4/2004 | Kawai et al. | | 715/501.1 |
| 2004/0158815 A1 * | 8/2004 | Potgieter | | 717/120 |
| 2005/0071365 A1 * | 3/2005 | Hou et al. | | 707/102 |
| 2005/0154702 A1 * | 7/2005 | Liu et al. | | 707/1 |
| 2005/0210008 A1 * | 9/2005 | Tran et al. | | 707/3 |
| 2006/0004683 A1 * | 1/2006 | Talbot et al. | | 706/59 |
| 2006/0136589 A1 * | 6/2006 | Konig et al. | | 709/224 |
| 2006/0242130 A1 * | 10/2006 | Sadri et al. | | 707/3 |
| 2006/0287988 A1 * | 12/2006 | Mason | | 707/3 |
| 2007/0038653 A1 * | 2/2007 | Li et al. | | 707/100 |
| 2007/0143338 A1 * | 6/2007 | Wang et al. | | 707/103 R |
| 2009/0083203 A1 * | 3/2009 | Cho et al. | | 706/21 |
| 2009/0157572 A1 * | 6/2009 | Chidlovskii | | 706/12 |

OTHER PUBLICATIONS

Probabilistic Models of Text and Link Structure for Hypertext Classification, Getoor et al, in Proc.IJCAI01 Workshop on Text Learning: Beyond Supervision, Seattle, Wash., 2001.*

Learning Probabilistic Models of Link Structure, Getoor et al, Journal of Machine Learning Research 3, 679-707, 2002.*

(Continued)

*Primary Examiner* — Pierre Vital
*Assistant Examiner* — Augustine K Obisesan
(74) *Attorney, Agent, or Firm* — Bao Tran; Joseph Kolodka (57) ABSTRACT

Systems and methods are disclosed for extracting characteristics from a corpus of linked documents by deriving a content link model that explicitly captures direct and indirect relations represented by the links, and extracting document topics and the topic distributions for all the documents in the corpus using the content-link model.

21 Claims, 5 Drawing Sheets

OTHER PUBLICATIONS

Link-based Classification, Lu et al., Proceeding of the Twentieth International COnference on Machine Learning (ICML-2003), Washingtn DC, 2003.*

Thesus: Organizing Web document collections based on link semantics, Halkidi et al, the VLDB Journal, pp. 320-332, 2003.*

Modeling and Combining Evidence Provided by Document Relationship Using Probabilistic Argumentation Systems, Picard et al, ACM, 1998.*

Link-Based and Content-Based Evidential Information in a Belief Network Model, Silva et al., ACm, 2000.*

Bayesian Networks Classifiers applied to Document, Souafi-Bensafi et al, IEEE 2002.*

Probabilistic Author-Topic Models for Information Discovery, Steyvers et al, 10th ACM SigKDD conference knowledge discovery and data mining, Seattle, 2004.*

Link Prediction in Relational Data, Taskar et al., Proceedings of Neural Information Processing Systems pp. 659-666, 2003.*

Evaluation of an Inference Network-Based Retrieval Model, Turtle et al, ACM Transaction on Information Systems, 9(3), pp. 187-222, 1991.*

Multi-Documnet Summarization Using Cluster-Based Link Analysis, Wan et al., SIGIR, pp. 299-306, 2008.*

Implicit Link Analysis for Small Web Search, Xue et al, SIGIR, pp. 56-63, 2003.*

Automatic Construction of Networks of Concepts Characterizing Document Databases, Chen et al, IEEE Transactions on Systems, Man, and Cybernetics, 22(5); pp. 885-902, 1992.*

Building Bayesian Network-based Information Retrieval Systems, Campos et al., 2nd LUMIS Workshop, pp. 543-552; 2000.*

Probabilistic Models for Discovering E-Communities, Zhou et al, Proceedings of the 15th international conference on World Wide Web, pp. 173-182, May 23-26, 2006.*

Combining Web Document Representations in a Bayesian Inference Network Model Using Link and Content-Based Evidence, Tsikrika et al, 24th European colloquium on information retrieval research,pp. 53-72; 2002.*

Probabilistic Latent Semantic Visualization: Topic Model for Visualizing Documents, Iwata et al., KDD'08 pp. 363-371, Aug. 24-27, 2008.*

Analyzing Entities and Topics in News Articles Using Statistical Topic Models, Newman et al., ISI 2006, LNCS 3975, pp. 93-104, 2006.*

Analysis of Semantic and Clinical data: Latent Semantic analysis for text-based research, Foltz., Behavior Research Methods, Instruments, & Computers, 28(2), pp. 197-202, 1996.*

Latent Semantic Indexing: A Probalistic Analysis, Papadimitriou et al., PODS'98, ACM, pp. 159-168, 1998.*

A probabilistic Approach to Semantic Represenation, Griffiths et al., Proceedings of the Twenty-Fourth Annual Conference of Cognitive Science Society, 2002.*

Topic-Based Document Segmentation with Probabilistic Latent Semantic Analysis, Brants et al., CIKM'02, pp. 211-218, Nov. 4-9, 2002.*

Modeling Documents by Combining Semantic Concepts with Unsupervised Statistical Learning, Chemudugunta et al, ISWC 2008, LNCS 5318, pp. 229-244, 2008.*

Mining Business Topics in Source COde unsing Latent Dirichlet Allocation, Maskeri et al., ISEC'08 Feb. 19-22, 2008, pp. 113-120, 2008.*

Rosen-Zvi et al, The Author-Topic Model for Authors and Documents.

Cohn et al, Learning to Probabilistically Identify Authoritative Documents.

Blei et al,Latent Dirichlet Allocation, Journal of Machine Learning Research 3 (2003) 993-1022.

Hoffman et al, Probabilistic Latent Semantic Indexing, Proceedings of the Twenty-Second Annual International SIGIR Conference on Research and Development in Information Retrieval.

Zhu et al,Combining Content and Link for Classification using Matrix Factorization, SIGIR'07, Jul. 23-27, 2007.

* cited by examiner

SYSTEMS AND METHODS FOR CHARACTERIZING LINKED DOCUMENTS USING A LATENT TOPIC MODEL

The present application claims priority to U.S. Provisional Application Ser. No. 61/138,646 filed on Dec. 18, 2008, the content of which is incorporated by reference.

BACKGROUND

The present invention relates to characterizing linked documents.

A fundamental problem in the information retrieval field is to characterize the content of documents. By capturing the essential characteristics in the documents, one gives the documents a new representation, which is often more parsimonious and less noise-sensitive. Such a new representation facilitates efficient organizing and searching of the documents and therefore improves user experiences in an information retrieval system. The new representation may also benefit other tasks such as classifying, clustering, and visualizing the documents.

The need for characterizing document content has increased significantly due to the rapid development of the Internet which has made available huge document repositories (such as digital libraries) online. Documents in many corpora, such as digital libraries and webpages, typically contain both content and link information.

Among the existing methods that extract essential characteristics from documents, topic model plays a central role. The topic model bridges the gap between the documents and words by characterizing the content of documents in terms of the latent semantic space to enable capabilities such as clustering, summarizing and visualizing. The topic model also provides meaningful interpretation of the documents through a probabilistic generative model which associates the document with a set of topics by the membership probabilities.

Topic models extract a set of latent topics from a corpus and as a consequence represent the documents in a new latent semantic space. This new semantic space captures the essential latent topics of each document and therefore enable efficient organizing of the corpus for the tasks such as browsing, clustering, and visualizing. One of the well-known topic models is the Probabilistic Latent Semantic Indexing (PLSI) model. In PLSI each document is modeled as a probabilistic mixture of a set of topics. Another approach called PHITS uses a probabilistic model for the links which assumes a generative process for the links similar to that in PLSI. Thus, PHITS ignores the content of the documents and characterize the documents by the links.

A Latent Dirichlet Allocation (LDA) model has been used which incorporates a prior of the topic distributions of the documents. In these probabilistic topic models, one assumption underpinning the generative process is that the documents are independent. More specifically, it is assumed that the topic distribution of each document is independent of those of other documents. However, this assumption does not always hold in practice, because documents in a corpus are usually related to each other in certain ways. Often, one can explicitly or implicitly observe such relation in a corpus, e.g., through the citations and co-authors of a paper or through the content similarity among documents. In such a case, these observations should be incorporated into the topic model in some way in order to derive more accurate latent topics that reflect the relation among the documents well. The LDA model is a parametric empirical Bayes model which introduce a Dirichlet prior for the topic distributions of the documents. One difficulty in LDA is that the posterior distribution is intractable for exact inference and thus an approximation inference algorithm has to be considered. Introduction of the prior makes it possible to generate new documents which is not available in the training stage, but the approximation inference algorithm is slower than PLSI in practice, which might be an issue for large corpora. The author-topic model has been used to extend LDA by including the authors information. Specifically, the author-topic model considers the topic distribution of the document as a mixture of topic distributions of the authors. Consequently, the author-topic model implicitly consider the relations among the document through the authors. Similar to the author-topic model, the CT model and the BPT model explicitly consider the relations among the documents by modeling the topic distribution of each document as a mixture of the topic distribution of the related documents.

With the development of internet, most of the webpages and documents are linked to each other by the hyperlinks. Incorporating link information into the topic model is expected to provide better document modeling. Recent studies have attempted to combine both the contents and the links in a corpus of linked documents. For example, the PLSI model has been applied once on contents and another time on links, and combined in a linear fashion. As another example, the contents and links have been fused into a single objective function for optimization. However, these approaches have treated links as a feature in a similar way that the content features are treated. Such a yet-another-feature approach to treat links ignored two important properties of links. First, links are used to represent relations; and it is the relations represented by the links, not the links themselves, that are important to a topic model. The second property of links that is ignored by the above studies is that the relations represented by the links are often transitive.

In another trend, document clustering is a fundamental tool for these tasks and an important application of topic models. K-means clustering is a widely used clustering algorithm which minimizes the sum of squared errors between the documents and the cluster centers. Spectral clustering has emerged as one of the most effective document clustering methods. In the spectral clustering, an undirected graph is constructed where nodes represent the documents and edges between nodes represent the similarity between the documents. The document clustering task is accomplished by finding best cuts of the graph that optimizes certain predefined criterion functions, which usually leads to the computation of the eigenvectors of certain matrices. Another important class of the document clustering methods rely on non-negative matrix factorization (NMF) technique.

SUMMARY

In one aspect, systems and methods are disclosed for extracting characteristics from a corpus of linked documents by deriving a content link model that explicitly captures direct and indirect relations represented by the links, and extracting document topics and the topic distributions for all the documents in the corpus using the content-link model.

In another aspect, systems and methods are disclosed for characterizing a corpus of documents each having one or more links by forming a Bayesian network using the documents; determining a Bayesian network structure using the one or more links; and generating a content link model; and determining one or more topics in the corpus and topic distribution for each document.

Implementations of the above aspects may include one or more of the following. The content link model captures direct and indirect relationships represented by the links. The system can apply a Bayesian inference to extract document topics. A non-negative matrix factorization can be applied to the content link model. A maximum likelihood estimation can be used with the content link model. Also, a Bayesian inference can be used for the BPT model. The Bayesian network encodes direct and indirect relations, and wherein relationships are derived explicitly from links or implicitly from similarities among documents. The obtained topics can be used for characterizing, representing, summarizing, visualizing, indexing, ranking, or searching the documents in the corpus. The topics and the topic distributions can also be used to derive features for document clustering or classification. Expectation-Maximization (EM) algorithm can be used to estimate the parameters in the citation-topic model and the Bernoulli-process topic model. Nonnegative matrix factorization (NMF) can be used to estimate parameters for the Bayesian network, such as applying the NMF to perform maximum likelihood estimation for the citation topic model or to perform Bayesian inference for the Bernoulli-process topic model.

Advantages of the preferred embodiment(s) may include one or more of the following. The system uses document relationship information in the links. Additionally, the system treats links more than a feature similar to document contents and thus takes into consideration important properties of the document relations represented by the links. The above factors allow the system to accurately capture and exploit the relations represented by links.

The models explicitly consider the document relations represented by links, where links are used to form the structure of the generative model. As a result, in the models a given document is modeled as a mixture of a set of topic distributions, each of which is the topic distribution of a document that is related to the given document. Moreover, the models contain a random process for selecting the related documents and therefore, the transitivity of the relations among the documents is captured. Using the models, the system can capture the relations among linked documents more accurately and extract topics in a corpus with higher quality. The extracted topics from the corpus can help improve document organization (e.g., through better indexing and ranking), improve user experiences (e.g., through more efficient searching and higher quality visualization), and provide business values (e.g., in customer opinion analysis) among others.

Although the CT model and the BPT models are motivated by the citation relationship among the documents, they can handle other types of relationships as well as corpora without explicit link information. The CT model and the BPT model can be applied to many applications such as organizing and indexing documents, detecting latent topics from a corpus, classifying or clustering the documents and characterizing the documents in terms of the latent topics, among others.

DESCRIPTION

Systems and methods are disclosed below for characterizing a corpus of documents. The content of each document is a mixture of two sources: (1) the topics of the given document and (2) the topics of the documents that are related to (e.g., cited by) the given document. The system extracts characteristics from a corpus of linked documents by deriving a content link model that explicitly captures direct and indirect relations represented by the links, and extracting document topics and the topic distributions for all the documents in the corpus using the content-link model. To capture the indirect relations among documents, the models contains a generative process to select related documents where the related documents are not necessarily directly linked to the given document.

Two generative models, called the citation-topic (CT) model and the Bernoulli-Process Topic (BPT) model, respectively, can be used for modeling linked documents that explicitly addresses the properties of links. In the CT and BPT models, links are not treated as features; instead, they are used to determine the structure of the generative model. As a result, in the models each document is modeled as a distribution over the topics that is a mixture of the distributions associated with the related documents. The difference between the two models is whether the topic parameters are estimated as a point estimation or as a Bayesian estimation. A generative process is used in the models to capture indirect relations among linked documents. This generative process can be interpreted intuitively in terms of a random walk on a directed graph induced by the links. In addition, this generative process can be efficiently implemented by using a special prior distribution in the generative model. A maximum likelihood treatment can be used for the parameter inference in the CT model and a variational Bayesian treatment for the parameter inference in the BPT model. Instead of using the standard expectation-maximization (EM) algorithm, which lacks scalability issue, one embodiment uses a nonnegative matrix factorization (NMF) method, whose multiplicative update rules are more efficient and fully take advantage of the sparseness in the data. A sparse LU-decomposition-based technique can be used further improve the computational efficiency.

Figure 1A:
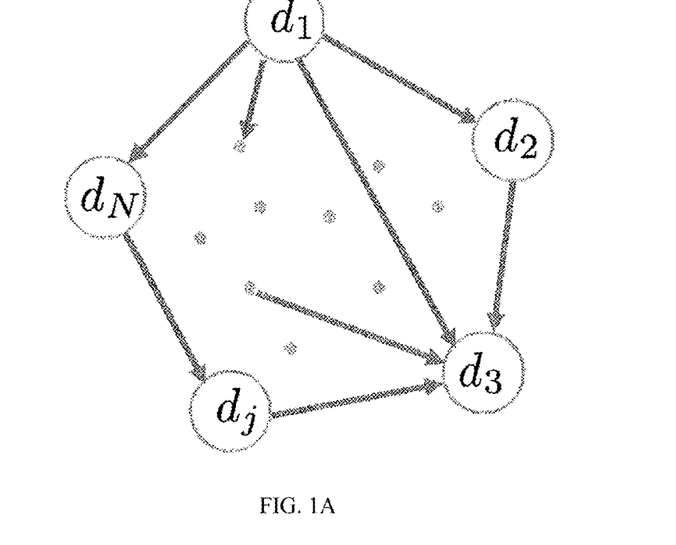
FIG. 1A shows an exemplary illustration of a citation topic model.

FIG. 1A shows an exemplary illustration of a citation topic model. As discussed next, a citation-topic (CT) model is a generative probabilistic model of a corpus along with the citation information among the documents, each document is represented as a mixture over latent topics, and the relationship among the documents is modeled by another generative process such that the topic distribution of each document is a mixture of the distributions associated with the related documents.

In the example illustrated in FIG. 1A, a corpus consists of N documents $\{d_j\}_{j=1}^N$ in which M distinct words $\{w_i\}_{i=1}^M$ occur and each document d might have a set of citations $C_d$, and further that the documents are linked together by these citations. In such a scenario, the corpus can be represented by a directed graph as shown in FIG. 1A. Other types of relationships among the documents are also possible such as hyperlinks among the webpages and they also lead to a directed graph as shown in FIG. 1A. Consequently, a CT model is applicable to the general scenario where the linked documents can be represented by the directed graph.

The CT model uses the following generative process for each word w in the document d in the corpus, with parameters $\Xi$, $\Theta$ and $\Psi$.

1. Choose a related document c from $p(c|d,\Xi)$, a multinomial probability conditioned on the document d
2. Choose a topic z from the topic distribution of the document c, $p(z|c,\Theta)$
3. Choose a word w which follows the multinomial distribution $p(w|z,\Psi)$ conditioned on the topic z As a result, one obtains the observed pair (d,w), while the latent random variables c,z are discarded. To obtain a document d, one repeats this process |d| times, where |d| is the length of the document d. The corpus is obtained once every document in the corpus is generated by this process, as shown in FIG. 1B.

Figure 1B:
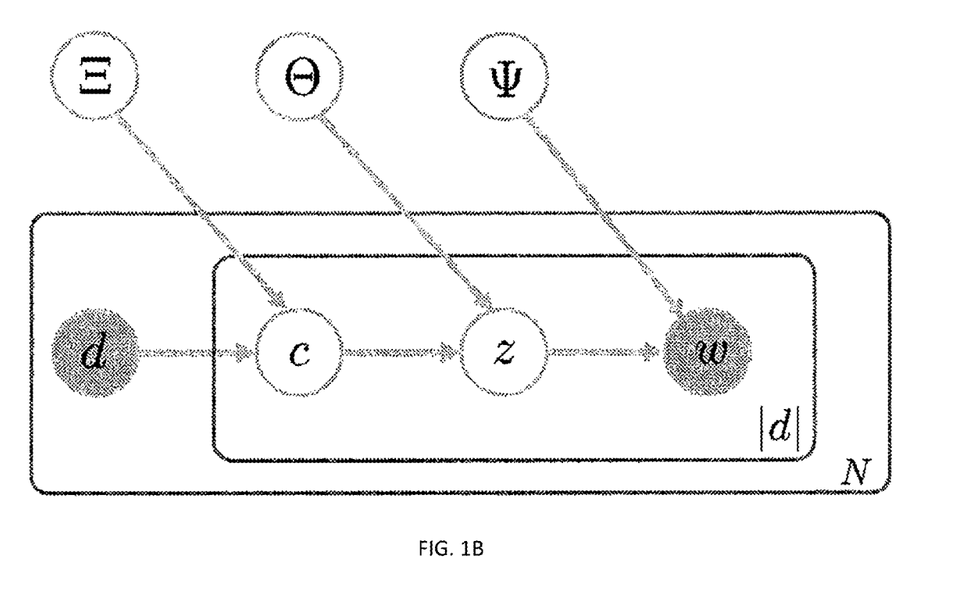
FIG. 1B shows an exemplary graphical model representation of CT using a plate notation.

FIG. 1B shows an exemplary graphical model representation of CT using a plate notation. The boxes are "plates" representing replicates. The outer plate represents the documents, while the inner plate represents the repeated choice of related documents, topics and words within a document.

The document probability parameter $\Xi$ is treated as the fixed quantity computed from the citation information of the corpus. For example, if the document $d_s$ has a set of citations $Q_{d_s}$, a matrix S is constructed to denote the direct relationships among the documents in this way:

$$S_{ls} = \frac{1}{|Q_{d_s}|}$$

for $d_l \in Q_{d_s}$ and 0 otherwise, where $|Q_{d_s}|$ denotes the size of the set $Q_{d_s}$. One solution is to obtain $\Xi$ according to the matrix S, $\Xi=S$.

However, this solution is not enough to capture the relationship among the documents. In the example in FIG. 1A, $d_N$ does not cite $d_3$ directly and $\Xi_{3,N}=0$ according to the above strategy. But $d_N$ is related to $d_3$ indirectly through $d_j$. Therefore, $\Xi_{3,N}$ should not be equal to 0.

To incorporate the indirect relationships among the documents, a generative process is used for generating a related document c from the given document $d_s$.

1. Let l=s.
2. Choose t:Bernoulli($\alpha$).
3. If t=1, choose h:Multinomial($S_{\cdot,l}$), where $S_{\cdot,l}$ denote the l-th column of S, let l=h, and return to the step 2.
4. If t=0, let $c=d_l$.

The above generative process combines the Bernoulli process and the random walk on the directed graph together, where the indirect relationships among the documents are captured. The parameter $\alpha$ of the Bernoulli process determines the probability that the random walk stops at the current node.

Figure 2:
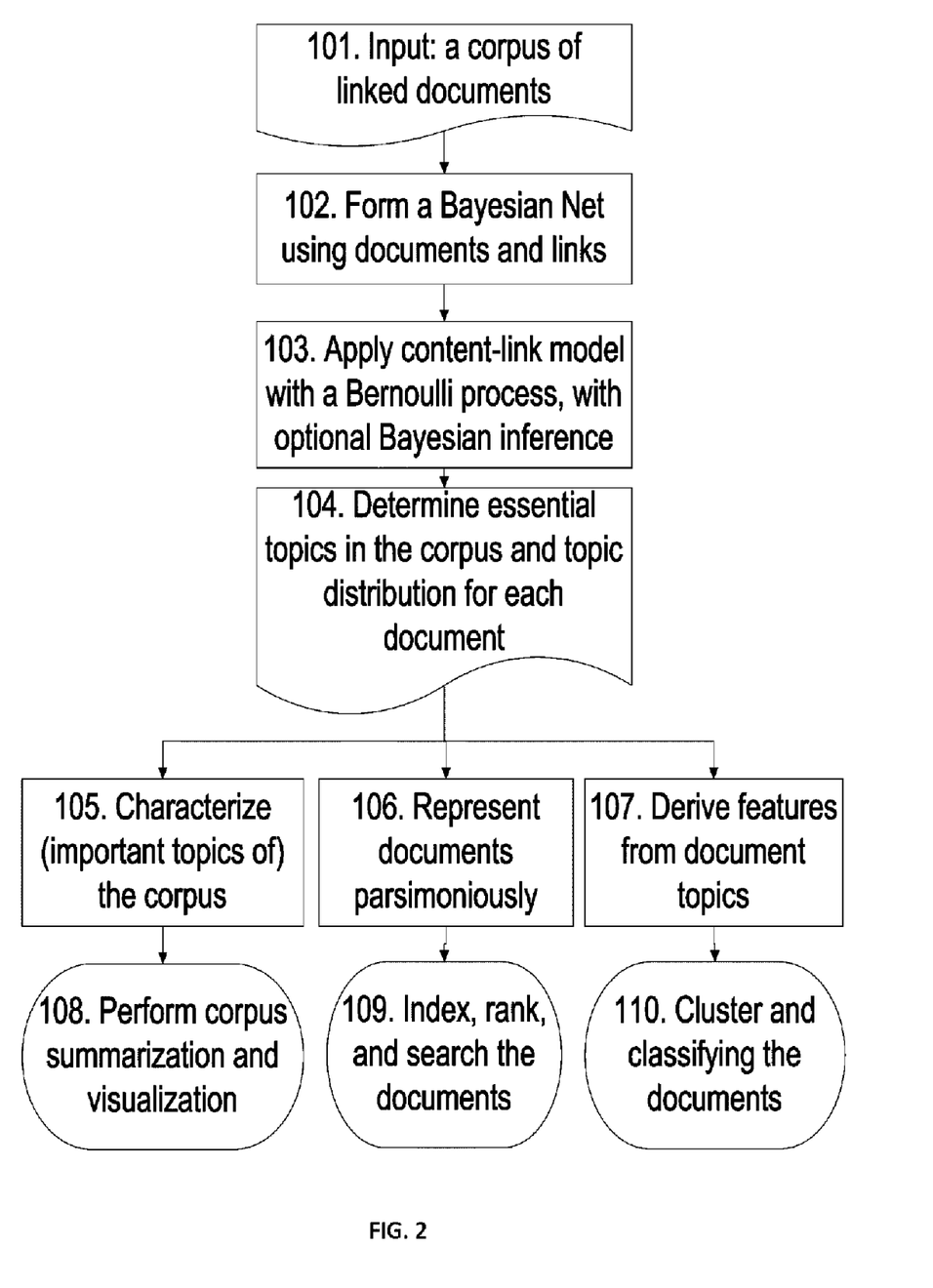
FIG. 2 shows an exemplary process that uses link information for topical learning.

FIG. 2 shows an exemplary process where the CT model uses link information for topical learning. For simplicity, the following discussion addresses the situation where citations among the documents are available, and extensions to other cases are can be done.

Turning now to FIG. 2, in 101, the process receives as input a corpus of linked documents where the links can be either explicit or implicit. In 102, the process forms a Bayesian network using both the documents and links. The links are used to determine the structure of the Bayesian network. The system of FIG. 2 uses the CT model and explicitly considers the document relations represented by links. In the CT model, instead of being treated as another feature, links are used to form the structure of the generative model. As a result, in the CT model a given document is modeled as a mixture of a set of topic distributions, each of which is the topic distribution of a document that is related to the given document. Moreover, the CT model contains a random process for selecting the related documents and therefore, the transitivity of the relations among the documents is captured. In one embodiment, a second topic model, the Bernoulli-Process Topic (BPT) model, uses a Bayesian treatment of parameter estimation. The parameters of both the CT model and the BPT model can be efficiently estimated by a nonnegative matrix factorization (NMF) method.

Next, in 103, a nonnegative matrix factorization (NMF) method is applied to generate a maximum likelihood estimation in the CT model or the Bayesian inference in the BPT model. This operation is detailed in FIG. 3.

In 104, essential topics in the corpus and topic distribution are generated for each document. These are the output obtained by using the nonnegative matrix factorization in 103. In 105-107, the essential topics are applied. In one option in 105, the process derives key characteristics from a corpus by using the topics obtained in 104. In another option, in 106, the process can derive a more parsimoniously representation of the documents in the corpus using the topics obtained in 104. Alternatively, in 107, the process derives features from the documents in a corpus by using the topics obtained in 104, and applies the features in clustering and classification.

In 108, the process can perform summarization and visualization of the documents using information obtained from 105. Alternatively, in 109, the process can efficiently generate document indices, rankings, and searching mechanisms using information obtained from 106. In yet another embodiment, in 110, the process generates clusters and class labels using information obtained from 107.

Figure 3:
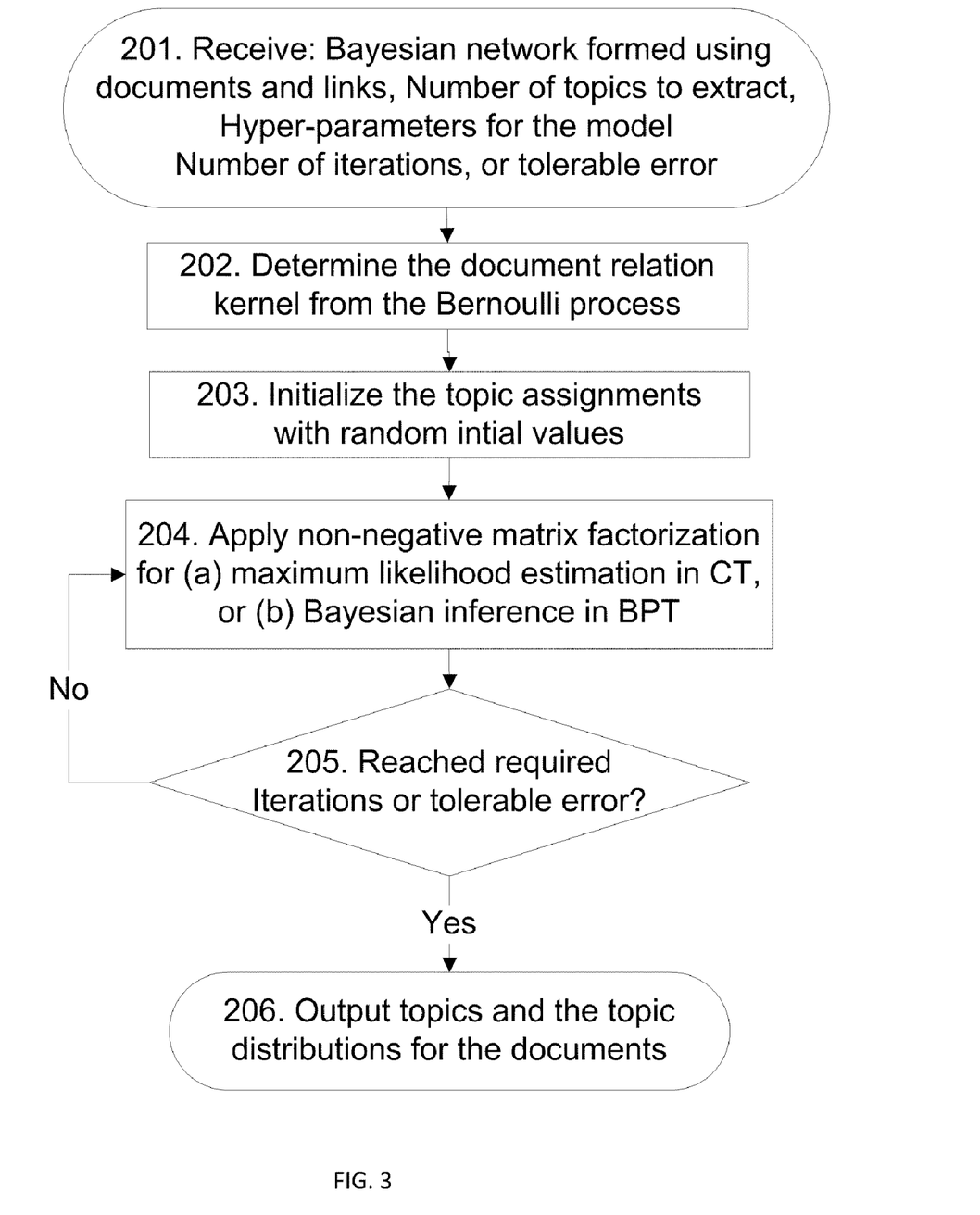
FIG. 3 shows an exemplary process to identify topics and topic distribution.

Referring now to FIG. 3, an exemplary process to identify topics and topic distribution is shown. In 201, the process receives as input a Bayesian network formed by using both the documents and the corresponding links in the corpus. Next, in 202, a Bernoulli process is used to determine a document relation kernel used in the Bayesian network. In 203, the topics of the documents are assigned to random initial values. In 204, a non-negative matrix factorization is applied to compute the maximum likelihood estimation in the CT model or the Bayesian inference in the BPT model. In 205, the process repeat 204 until a minimum number of required iterations is reached or a tolerable error is reached. In 206, the process returns the computed topics and the topic distributions for all the documents as the output.

Figure 4:
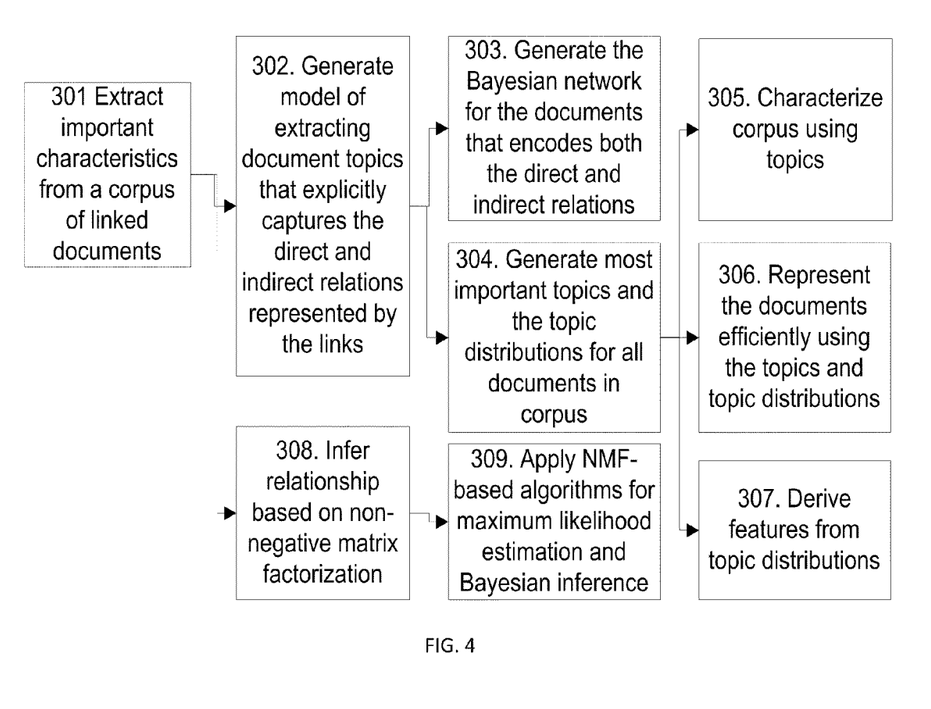
FIG. 4 shows an exemplary system for characterizing documents.

FIG. 4 shows an exemplary system for characterizing documents. The system extracts important characteristics from a corpus of linked documents in 301. In 302, the system applies a derived model to extract document topics. The model explicitly captures the direct and indirect relationships represented by the links in 302.

In one embodiment, a generative process is used in the models to capture indirect relations among linked documents. This generative process can be interpreted intuitively in terms of a random walk on a directed graph induced by the links. In addition, this generative process can be efficiently implemented by using a special prior distribution in the generative models. In this embodiment, a maximum likelihood treatment is adopted for the parameter inference in the CT model and a variational Bayesian treatment is adopted for the parameter inference in the BPT model. Instead of using the standard expectation-maximization algorithm, which suffers from the scalability issue in practice, the system applies nonnegative matrix factorization (NMF) methods, whose multiplicative update rules are more efficient and can take advantage of the sparseness in the data. A sparse LU-decomposition-based technique can be used to further improve the efficiency of the system. The system then applies an inference method such as one based on non-negative matrix factorization in 308. Optionally, in 309, the system applies non-negative-based algorithms for maximum likelihood estimation in the CT model and the Bayesian inference in the BPT model.

In 303, the process generates a Bayesian network for the documents that encodes the direct and indirect relations, where the relations are derived either explicitly from links or implicitly from the similarities among documents. In 304, the process generates the most important topics and the topic distributions for all the documents in a corpus. In 305, in one embodiment, the process applies the obtained topics for characterizing, summarizing, and visualizing the corpus. In another embodiment, in 306, the system applies the obtained topics and the topic distributions for the documents for efficiently indexing, ranking, and searching the documents in the corpus. In yet another embodiment, in 307, the system applies the obtained topics and the topic distributions for the documents to derive additional features for other tasks such as document clustering and classification.

Next, methods for parameter estimation are discussed. One implementation uses the expectation-maximization (EM) method for maximum likelihood estimation in latent variable models. EM is an iterative process which alternates two steps: (i) an expectation (E) step where the posterior probabilities are computed for the latent variables based on the current estimates of the parameters, (ii) a maximization (M) step where the parameters are updated based on the posterior probabilities computed in the previous E-step.

In another embodiment, the EM process can be implemented using a nonnegative matrix factorization (NMF) technique. In one embodiment, the computation complexity is greatly reduced by taking the LU factorization without explicitly computing the inverse.

A Bernoulli Process Topic (BPT) model is a generative probabilistic model of a corpus along with the citation information among the documents. Similar to the existing topic models, each document is represented as a mixture over latent topics. The main difference from the existing topic models is that the relationship among the documents is modeled by another generative process such that the topic distribution of each document is a mixture of the distributions associated with the related documents.

One exemplary pseudo-code for the variational EM to perform parameter estimation is as follows:

Input: the document $D = \{d_1, d_2, \ldots, d_N\}$

Output: the variational parameters $\{\gamma_i, 1 \leq i \leq N\}$ and the model parameters $\alpha$, $\Lambda$ repeat Update the maxtrix $V$ where $V_{jl} = \exp\left(\Psi(\gamma_{jl}) - \Psi\left(\sum_{t=1}^{K} \gamma_{jt}\right)\right)$ Update the maxtrix $A'$ where $A'_{hg} = \dfrac{A_{hg}}{[\Lambda V^T \Xi]_{hg}}$ Update $\gamma$ where $\gamma_{sl} = \alpha_l + V_{sl}[\Xi A'^T \Lambda]_{sl}$ Update the maxtrix $V$ where $V_{jl} = \exp\left(\Psi(\gamma_{jl}) - \Psi\left(\sum_{t=1}^{K} \gamma_{jt}\right)\right)$.

Update the maxtrix $A'$ where $A'_{hg} = \dfrac{A_{hg}}{[\Lambda V^T \Xi]_{hg}}$.

Update the parameter $\Lambda$ where $\Lambda_{hl} \leftarrow \Lambda_{hl}[A'\Xi^T V]_{hl}$ $$\text{maximize } L_{[\alpha]} = \sum_{j=1}^{N}\left[\begin{array}{l}\log \Gamma\left(\sum_{l=1}^{K} \alpha_l\right) - \sum_{l=1}^{K} \log \Gamma(\alpha_l) + \\ \sum_{l=1}^{K}(\alpha_l - 1)\left(\Psi(\gamma_{jl}) - \Psi\left(\sum_{t=1}^{K} \gamma_{jt}\right)\right)\end{array}\right]$$

to obtain dirichlet parameter $\alpha$ until convergence

Although the CT model and the BPT model are motivated by the citation relationships among the documents, the inventors contemplate that they can be generalized for the general linked document since all can be represented by a directed graph. Moreover, the CT model and the BPT model can be extended for the more general corpus where no explicit link information is available. In one embodiment, a k-nearest neighbor (k-NN) graph can be constructed based on the similarity measure between the documents and the corpus can be represented by an undirected graph from which the parameter matrix $\Xi$ can be obtained. The affinity matrix W which measures the similarities between the documents can be formed based on the k-NN undirected graph. Then the matrix S can be constructed by $S=WD^{-1}$, where D is a diagonal matrix with its entry $D_{ii}=\Sigma_j W_{ji}$.

The above two probabilistic generative models incorporate the relationships among the documents. Motivated by the observations that one document plays two different roles in the corpus: document itself and a citation of other documents, each document is modeled as a distribution over the topics that is a mixture of the distributions associated with the related documents. Consequently, the system models the corpus at a finer level by differentiating these two roles for each document. This perspective is intuitive and reflects the process of drafting documents such as scientific articles: the authors first learn knowledge from some literature and then combine their own creative ideas with the learned knowledge to form the new content for the paper.

Moreover, the CT model and the BPT model can be generalized for the general corpus without the explicit link information available. A nonnegative matrix factorization algorithm is used to estimate the distribution parameters. To overcome the computation cost of the matrix inverse, sparse LU factorization is used to speed up the computation. The CT model and the BPT models can be applied to document collections for document clustering and topic detection task. Test comparisons against some state-of-the-art approaches demonstrate high performance.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 5:
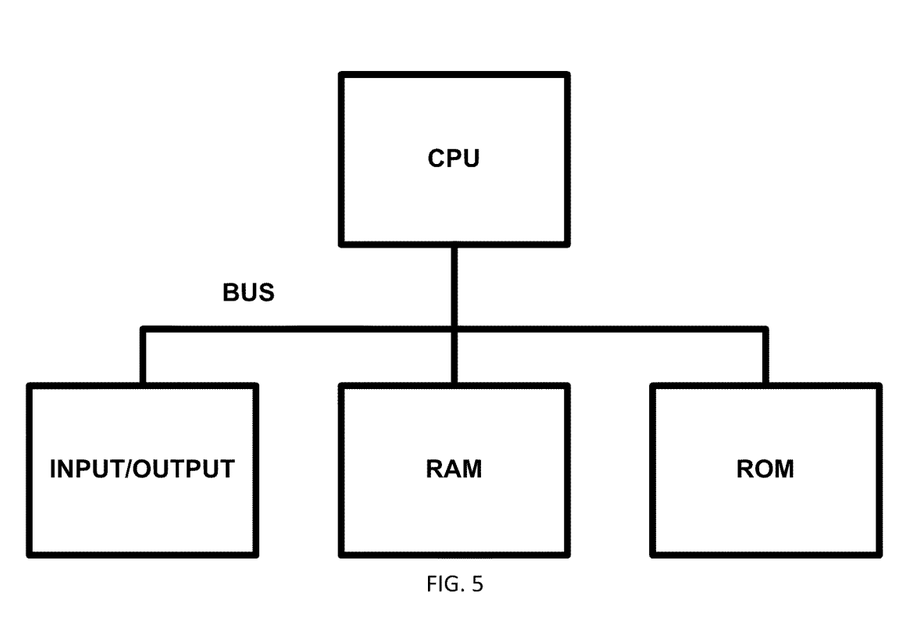
FIG. 5 shows a block diagram of a computer to support the system.

By way of example, FIG. 5 shows a block diagram of a computer to support the system. The computer preferably includes a processor, random access memory (RAM), a program memory (preferably a writeable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM.

I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method for characterizing a corpus of documents each having one or more links, comprising:
    forming a Bayesian network using the documents;
    determining a Bayesian network structure using the one or more links;
    generating a content link model where the model is a generative probabilistic model of the corpus along with citation information among documents, each document represented as a mixture over latent topics, and each relationship among documents is modeled by another generative process with a topic distribution of each document being a mixture of distributions associated with related documents;
    using a citation-topic (CT) model with a generative process for each word w in the document d in the corpus, with document probabilities $\Xi$, topic distribution matrix $\Theta$ and word probabilities matrix $\Psi$, including:
        choosing a related document c from p (c|d,$\Xi$), a multinomial probability conditioned on the document d;
        choosing a topic z from the topic distribution of the document c, p(z|c,$\Theta$);
        choosing a word w which follows the multinomial distribution p(w|z,$\Psi$) conditioned on the topic z; and
    determining one or more topics in the corpus and topic distribution for each document wherein the content link model captures direct and indirect relationships represented by the links.

2. The method of claim 1, comprising applying a Bayesian inference to extract document topics.

3. The method of claim 1, comprising applying non-negative matrix factorization to the content link model.

4. The method of claim 1, comprising performing a maximum likelihood estimation in the content link model.

5. The method of claim 1, comprising performing a Bayesian inference in a BPT (Bernoulli process topic) model.

6. The method of claim 1, wherein the Bayesian network encodes direct and indirect relations, and wherein relationships are derived explicitly from links or implicitly from similarities among documents.

7. The method of claim 1, comprising applying the topics for characterizing, representing, summarizing, visualizing, indexing, ranking, or searching the documents in the corpus.

8. The method of claim 1, comprising applying the topics and the topic distributions to derive features for document clustering or classification.

9. The method of claim 1, comprising applying EM to estimate the parameters in a citation-topic model and a Bernoulli-process topic model.

10. The method of claim 1, comprising applying a nonnegative matrix factorization (NMF) to estimate parameters for the Bayesian network.

11. The method of claim 10, comprising applying the NMF to perform maximum likelihood estimation for a citation topic model.

12. The method of claim 10, comprising applying the NMF to perform Bayesian inference for a Bernoulli-process topic model.

13. The system of claim 1, comprising a BPT (Bernoulli process topic) model with computer readable code to process an input document $D = \{d_1, d_2, \ldots, d_N\}$ to generate variational parameters $\{\gamma_i, 1 \leq i \leq N\}$ and regenerative model parameters $\alpha, \Lambda$, further comprising code to:

$$\text{Update the matrix } V \text{ where } V_{jl} = \exp\left(\Psi(\gamma_{jl}) - \Psi\left(\sum_{t=1}^{K} \gamma_{jt}\right)\right)$$

$$\text{Update the matrix } A' \text{ where } A'_{hg} = \frac{A_{hg}}{[\Lambda V^T \Xi]_{hg}}$$

$$\text{Update } \gamma \text{ where } \gamma_{sl} = \alpha_l + V_{sl}[\Xi A'^T \Lambda]_{sl}$$

$$\text{Update the matrix } V \text{ where } V_{jl} = \exp\left(\Psi(\gamma_{jl}) - \Psi\left(\sum_{t=1}^{K} \gamma_{jt}\right)\right)$$

$$\text{Update the matrix } A' \text{ where } A'_{hg} = \frac{A_{hg}}{[\Lambda V^T \Xi]_{hg}}$$

$$\text{Update the parameter } \Lambda \text{ where } \Lambda_{hl} \leftarrow \Lambda_{hl}[A'\Xi^T V]_{hl}$$

$$L_{[\alpha]} = \sum_{j=1}^{\overset{maximize}{N}} \left[\log\Gamma\left(\sum_{l=1}^{K} \alpha_l\right) - \sum_{l=1}^{K} \log\Gamma(\alpha_l) + \sum_{l=1}^{K}(\alpha_l - 1)\left(\Psi(\gamma_{jl}) - \Psi\left(\sum_{t=1}^{K}\gamma_{jt}\right)\right)\right] \text{ to obtain dirichlet parameter } \alpha.$$

14. The system of claim 1, comprising applying a nonnegative matrix factorization (NMF) method and a sparse LU-decomposition-based method.

15. A method for extracting characteristics from a corpus of linked documents, comprising:
- deriving a content link model that explicitly captures direct and indirect relations represented by the links where the model is a generative probabilistic model of the corpus along with citation information among documents, each document represented as a mixture over latent topics, and each relationship among documents is modeled by another generative process, with a topic distribution of each document being a mixture of distributions associated with related documents,
- using a citation-topic (CT) model with a generative process for each word w in the document d in the corpus, with document probabilities $\Xi$, topic distribution matrix $\Theta$ and word probabilities matrix $\Psi$, including:
  - choosing a related document c from $p(c|d,\Xi)$, a multinomial probability conditioned on the document d;
  - choosing a topic z from the topic distribution of the document c, $p(z|c\ \Theta)$;
  - choosing a word w which follows the multinomial distribution $p(w|z,\Psi)$ conditioned on the topic z;
  and
- extracting document topics and the topic distributions for all the documents in the corpus using the content-link model, wherein the content link model captures direct and indirect relationships represented by the links.

16. The method of claim 15, comprising applying inference algorithms based on non-negative matrix factorization to the content model.

17. The method of claim 15, comprising generating a Bayesian network for the documents that encodes the direct and indirect relations, wherein the relations are derived either explicitly from links or implicitly from the similarities among documents.

18. The method of claim 15, comprising applying the topics for characterizing, representing, summarizing, visualizing, indexing, ranking, or searching the documents in the corpus.

19. The method of claim 15, comprising applying the topics and the topic distributions to derive features for document clustering or classification.

20. A system for extracting characteristics from a corpus of linked documents, comprising:
- a processor and a data storage device coupled to the processor;
- computer readable code to derive a content link model that explicitly captures direct and indirect relations represented by the links where the model is a generative probabilistic model of the corpus along with citation information among documents, each document represented as a mixture over latent topics, and each relationship among documents is modeled by another generative process with a topic distribution of each document being a mixture of distributions associated with related documents,
- using a citation-topic (CT) model with a generative process for each word w in the document d in the corpus, with document probabilities $\Xi$, topic distribution matrix $\Theta$ and word probabilities matrix $\Psi$, including:
  - choosing a related document c from $p(c|d,\Xi)$, a multinomial probability conditioned on the document d;
  - choosing a topic z from the topic distribution of the document c, $p(z|c,\Theta)$;
  - choosing a word w which follows the multinomial distribution $p(w|z,\Psi)$ conditioned on the topic z;
  and
- computer readable code to extract document topics and the topic distributions for all the documents in the corpus using the content-link model, wherein the content link model captures direct and indirect relationships represented by the links.

21. A system for characterizing a corpus of documents each having one or more links, comprising:
- a processor and a data storage device coupled to the processor;
- computer readable code to form a Bayesian network using the documents;
- computer readable code to determine Bayesian network structure using the one or more links;
- computer readable code to generate a content link model; and
- computer readable code to apply the content link model to determine one or more topics in the corpus and topic distribution for each document; and
- where the model is a generative probabilistic model of the corpus along with citation information among documents, each document represented as a mixture over latent topics, and each relationship among documents is modeled by another generative process with a topic distribution of each document being a mixture of distributions associated with related documents;
- using a citation-topic (CT) model with a generative process for each word w in the document d in the corpus, with document probabilities $\Xi$, topic distribution matrix $\Theta$ and word probabilities matrix $\Psi$, including:
- choosing a related document c from $p(c|d,\Xi)$, a multinomial probability conditioned on the document d;
- choosing a topic z from the topic distribution of the document c, $p(z|c,\Theta)$;
- choosing a word w which follows the multinomial distribution $p(w|z,\Psi)$ conditioned on the topic z;
- wherein the content link model captures direct and indirect relationships represented by the links.

* * * * *